United States Patent
Neuhaus-Steinmetz et al.

(10) Patent No.: US 6,677,000 B2
(45) Date of Patent: Jan. 13, 2004

(54) EB AND/OR UV CROSSLINKING AND POLYMERIZATION OF MATERIAL IN WEB FORM

(75) Inventors: Hermann Neuhaus-Steinmetz, Ahrensburg (DE); Ralf Hirsch, Quickborn (DE)

(73) Assignee: tesa Akteingesellschaft, Hamburg (DE)

( * ) Notice: Subject to any disclaimer, the term of this patent is extended or adjusted under 35 U.S.C. 154(b) by 2 days.

(21) Appl. No.: 10/227,014

(22) Filed: Aug. 23, 2002

(65) Prior Publication Data

US 2003/0143338 A1 Jul. 31, 2003

(30) Foreign Application Priority Data

Dec. 21, 2001 (DE) .......................... 101 63 545

(51) Int. Cl.⁷ .................................................. C08J 7/18
(52) U.S. Cl. ................. 427/500; 427/207.1; 427/208.4; 427/243; 427/385.5; 427/428; 427/496; 427/505; 427/508; 427/514; 427/516; 427/551; 427/558; 427/559; 427/561; 427/566
(58) Field of Search .............................. 427/500, 207.1, 427/208.4, 243, 385.5, 428, 496, 505, 508, 514, 516, 551, 558, 559, 561, 566

(56) References Cited

U.S. PATENT DOCUMENTS 4,622,260 A 11/1986 Tesch ........................ 428/173

6,284,328 B1 9/2001 Leydecker et al. ......... 427/496

FOREIGN PATENT DOCUMENTS

| DE | 43 13 008 C1 | 11/1994 | .......... C09J/133/06 |
| DE | 198 46 901 A1 | 4/2000 | .............. C09J/7/02 |
| DE | 198 46 902 A1 | 5/2000 | .............. C09J/7/02 |
| DE | 199 05 934 A1 | 8/2000 | ............. B05D/1/28 |
| DE | 199 05 935 A1 | 8/2000 | ............. B05D/5/10 |
| EP | 0 071 212 B1 | 4/1986 | .......... D04H/13/00 |
| EP | 0 578 151 A1 | 7/1993 | |
| EP | 0 453 254 B1 | 6/1997 | .............. C08J/7/02 |

*Primary Examiner*—Bernard Pianalto
(74) *Attorney, Agent, or Firm*—Norris McLaughlin & Marcus (57) ABSTRACT

A process for irradiating material in web form by means of electron beams and/or UV rays, wherein the material is applied to a transport means, the material on the transport means is guided through a first irradiation in which the material is irradiated on the open side, the material is transferred from the transport means to a substrate, and the material on the substrate is guided through a second irradiation in which the material is irradiated on the second, hitherto unirradiated, open side.

17 Claims, 3 Drawing Sheets

Figure 3

EB AND/OR UV CROSSLINKING AND POLYMERIZATION OF MATERIAL IN WEB FORM

The invention relates to a process for irradiating material by means of electron beams and/or UV rays, the material receiving a first irradiation and being transferred to a substrate, after which a second irradiation is carried out. In particular, said material comprises an adhesive tape.

Within process engineering, radiation crosslinking has found broad application, especially, for instance, in the crosslinking of adhesives, which can then be coated onto carrier materials such as polymer films, wovens or nonwovens.

With acrylic pressure sensitive adhesives, for example, crosslinking is needed in order to produce outstanding adhesive properties. With rubbers as well, the adhesive properties are improved by crosslinking.

In the production of adhesive tapes, the use of radiation-chemical crosslinking by UV radiation or electron beams (EB) possesses particular advantages as compared with the chemical/thermal crosslinking techniques.

Radiation-chemical crosslinking is also used advantageously in the production of double-sided adhesive tapes.

The depthwise distribution of the absorbed radiation dose in a product irradiated with accelerated electrons is known for any given acceleration voltage. A variety of authors have developed empirical functions for this (for example Heger, beta-gamma 1, 20, 1990). At RadTech Europe, Mediterraneo 1993, Neuhaus-Steinmetz published the following empirical function:

$$D[\%] = \frac{\exp\left\{-\left(\frac{18,8*X}{(U_B)^{1,57}} - 0,7\right)^2\right\}}{1 + \left(\frac{9,7*X}{(U_B)^{1,57}}\right)^{15}}$$

where
- D is the dose in %,
- $U_B$ is the acceleration voltage in kV, and
- X is the irradiated weight per unit area in $g/m^2$, consisting of the weight per unit area of the vacuum window, the air gap between vacuum window and product, and the depth in the product.

If the high weight per unit area of a product means that the maximum acceleration voltage of the electron beam unit is not enough for sufficiently uniform irradiation, the literature describes the possibility of irradiating from both sides, setting the same acceleration voltage and radiation dose for both sides.

For products which are composed of a coating to be crosslinked, which may for example be a pressure sensitive adhesive, and a radiation-degradable carrier, such as paper, woven or nonwoven cellulose or OPP film, for example, the damage can be minimized by optimizing the acceleration voltage. In this case the carrier receives a much lower average dose than the coating, while the dose reduction in the coating remains within acceptable limits. Relationships of this kind are described, inter alia, in EP 0 453 254 B (Yarosso et al.) and also in the text accompanying a lecture given by Dr. Karmann at the 7th Munich Adhesives and Finishing Seminar, 1982.

In UV crosslinking, the depth of penetration of the UV radiation is dependent on the formula and on the UV wavelengths at which the photoinitiator, which is necessary for crosslinking, becomes excited. In the case of UV-crosslinkable adhesive tapes it is advantageous if the photoinitiator is not "swimming" freely in the composition but is instead attached chemically to the polymer chains of the adhesive. This attachment typically occurs as early as during polymerization, since otherwise photoinitiators that are still present after crosslinking act as lubricants and lower the cohesion.

Moreover, it is advantageous to use photoinitiators which do not react to sunlight and do not react to the light from fluorescent lamps, since otherwise this may cause uncontrolled subsequent crosslinking. It follows from this that it is advantageous to use only photoinitiators which are sensitive at wavelengths <300 nm.

In the case of the UV polymerization of adhesive tapes, this is of little or no importance, since the aim in UV polymerization is to achieve as complete as possible a conversion of the monomers to polymers. A subsequent reaction would primarily bind in residual monomers, which would be more advantageous than detrimental. Accordingly, the use of photoinitiators which are sensitive at UV wavelengths between 300 and 400 nm is favored. Where these photoinitiators are used for polymerizing straight acrylic adhesives, it is possible to carry out successful polymerization of film thicknesses of significantly more than 1000 $\mu$m.

For adhesive tapes with shearing-resistant UV-crosslinking adhesives, the photoinitiators used at present are primarily those having their principal sensitivity in a range from 250 to 260 nm. On UV irradiation, in the absence of any secondary effects, the intensity of the radiation generally decreases exponentially with the depth. In straight acrylic adhesives, at a wavelength of 250 nm the UV intensity is typically only half of its surface level at a depth of about 25 to 35 nm. Accordingly, for film thicknesses of 60 to 90 $\mu$m at the latest, severe impairments in the adhesive properties are to be expected, since in that case either the side facing away from the UV lamps will be crosslinked hardly at all or the side facing toward the UV lamps will be heavily overcrosslinked.

In many double-sided adhesive tapes featuring acrylic adhesives, the adhesive films have thicknesses of around 100 $\mu$m or more. At such thicknesses, UV crosslinking with wavelengths around 250 to 260 nm is already highly problematic for the reasons described above. Consequently, such products are typically crosslinked thermally or using electron beams. In order to optimize the adhesive properties, resins are often mixed into the adhesives. In the wavelength range of interest, however, they absorb the UV radiation to a very great extent, so that producing a double-sided adhesive tape with adhesive films each of 50 $\mu$m presents problems, and it is also necessary to bear in mind a very low UV absorption when selecting the resins.

DE 199 05 934 A1 disclosed a process for producing a coating of solvent-free pressure sensitive adhesive systems on substrates, especially release-coated substrates, in which
a) the pressure sensitive adhesive system is applied in one or more layers by means of an adhesive applicator to a rotating roll,
b) the pressure sensitive adhesive system present on the roll is crosslinked in an irradiation means by high-energy radiation, specifically by means of electron beams (EB), UV or IR rays, and
c) the roll is contacted with the substrate so that the pressure sensitive adhesive system is transferred from the roll to the substrate and, where appropriate, is rolled up.

Typical irradiation means employed when configuring the process include linear cathode systems, scanner systems, or multiple longitudinal cathode systems, where electron beam accelerators are concerned.

The acceleration voltages lie within the range between 40 kV and 350 kV, preferably from 80 kV to 300 kV. The output doses range between 5 to 150 kGy, in particular from 20 to 90 kGy. The contacting of the substrate takes place in particular by way of a second roll. Substrates used include papers, films, nonwovens, and release-coated materials such as release papers, films, and the like.

DE 199 05 935 A1 discloses a process for producing a coating of solvent-free pressure sensitive adhesive systems on substrates, especially release-coated substrates, in which a fluid film is applied by means of a fluid applicator to a rotating roll, the pressure sensitive adhesive system is applied in one or more layers by means of an adhesive applicator to the fluid film, so that the fluid film is situated between roll and pressure sensitive adhesive system, and the roll is contacted with the substrate, so that the pressure sensitive adhesive system is transferred from the roll to the substrate (release-coated or otherwise).

Contacting of the substrate takes place in particuar by way of a second roll. Substrates used include papers, films, nonwovens, and release-coated materials such as release papers, films, and the like. The second roll, also referred to as a contact roll, is preferably provided with a rubber coating and is pressed against the roll with a linear pressure of preferably from 50 to 500 N/mm, in particular from 100 to 200 N/mm. The contact roll has a Shore hardness (A) of preferably from 40 to 100, in particular a Shore hardness of from 60 to 80 shore (A).

The fluid film is preferably water and/or distilled water, where appropriate with additions such as alcohol, wetting agents and/or agents insensitive to the adhesive formula, such as plasticizers or liquid aging inhibitors. In order to achieve uniform wetting, the surface tension of the fluid should be less than the surface tension of the roll that is to be wetted.

DE 198 46 901 A1 discloses a process for the radiation-chemical crosslinking of adhesive tapes coated on one side with an adhesive, the irradiation of the adhesive tape taking place through the carrier material of the adhesive tape onto the adhesive in such a way that the carrier material and that side of the adhesive which faces the carrier material receive a dose of from 30 to 200 kGy, in particular from 50 to 150 kGy, very particularly 100 kGy, and the acceleration voltage during the irradiation being chosen such that the dose on the open side of the adhesive has fallen to from 0 to 60 kGy, in particular from 0 to 50 kGy, with very particular preference from 10 to 20 kGy.

By this means it is ensured that, as a result of the high degree of crosslinking of the film of adhesive on the side facing toward the carrier, the migration of constituents of the adhesive to the open carrier side cannot take place, while the adhesive properties of the tape are adjusted by way of the crosslinking in the region of the open adhesive side and also by way of the depth-related reduction in electron beam dose in the product.

DE 198 46 902 A1 describes a process for the radiation-chemical crosslinking of double-sided adhesive tapes, in which a carrier material coated on both sides with adhesives is irradiated asymmetrically from both sides with different doses in an irradiation means.

In one of the preferred embodiments disclosed therein, the process for radiation-chemical crosslinking of double-sided adhesive tapes comprises the following steps:

a) coating a carrier material with an adhesive A, b) EB-crosslinking the adhesive A/carrier assembly on the adhesive side with a dose A and acceleration voltage A set on the EB unit, c) lining the adhesive A with a release liner, d) coating the second side of the carrier material with the adhesive B, and e) EB-irradiating the assembly on the open side of the adhesive B, using a dose B and acceleration voltage B which are set on the EB unit, the side with the release liner preferably being passed through the electron irradiation facility on a chill roll, and dose A being different from dose B and/or acceleration voltage A being different from acceleration voltage B.

There is no need to change the release liner, and no re-covering operation is necessary. The steps of the process can be performed in one pass. If considered necessary, it is also possible to carry out inline pretreatment and an additional leveling of the carrier, i.e., a smoothing of the carrier by heating owing to the poor flatness of the carrier (warping, for example).

To this end, first of all, in the case of EB crosslinking, the acceleration voltage and dose for the second irradiation that are to be set on the EB unit are calculated as a function of the individual thicknesses of the layers of the assembly, with total doses of up to 80 kGy or more in the layers of adhesive, preferably with the aid of a computer program, such that a) the dose on the open side of the release liner remains less than 40 kGy, preferably less than 10 kGy, b) the dose at the release liner/adhesive A interface remains less than 50 kGy, preferably less than 15 kGy, c) the surface dose in the adhesive B remains less than (target dose+25%), preferably less th an (target dose+15%), and d) the dose at the carrier/adhesive B interface remains greater than (target dose—25%), preferably greater (target dose—15%), e) while on the other hand the dose reduction in the adhesive B toward the carrier does not exceed 45%, preferably 25%, of the target dose.

It is an object of the invention to facilitate the advantageous manufacture of single-sided, double-sided, and carrier-free (unbacked) adhesive tapes, or, in general, coated and uncoated materials with little change in release properties on radiation-chemical crosslinking with accelerated electrons or UV rays.

The problems described are solved by a process as specified in the main claim. The subclaims describe advantageous embodiments of the process.

The invention accordingly provides a process for irradiating material in web form by means of electron beams and/or UV rays, wherein the material is applied to a transport means, the material on the transport means is guided through a first irradiation in which the material is irradiated on the open side, the material is transferred from the transport means to a substrate, and the material on the substrate is guided through a second irradiation in which the material is irradiated on the second, hitherto unirradiated, open side.

In one preferred embodiment, the material is shaped in web form with a die, especially a slot die, two-manifold or multiple-manifold die or an adapter die.

With further preference, the material may be shaped in web form in a two-roll or multi-roll applicator system, the first irradiation of the material taking place on one of the rolls of the two-roll or multi-roll applicator system and the material being transferred to the substrate by means of a further, transfer roll, over which the substrate runs. In accordance with the invention, following transfer to the substrate, the material receives a second UV or electron-beam irradiation, which acts, however, on the other side, which is now open.

This may take place in a particularly advantageous and effective way with a 2-roll to 5-roll applicator, very particularly with a 4-roll applicator, so that the material is shaped to the desired thickness as it passes through one or more roll nips.

The rolls of the applicator may be set individually to temperatures of from 20° C. to 150° C.

The preferred 4-roll applicator is formed by a metering roll, a doctor-blade roll, which defines the thickness of the layer and is arranged parallel to the metering roll, and a transfer roll, which is located beneath the metering roll.

Coating may take place with the web running in the same direction as the rolls or in the opposite direction.

In one especially advantageous embodiment of the invention, the rolls of the applicator can be set individually to temperatures of from 70° C. to 120° C., in particular 90° C. and 100° C.

In order to produce a sufficiently precise, thin, shaped film of material, the peripheral speeds of the rolls are different. For instance, without wishing to restrict the concept of the invention, the differential speeds in the case of a suitable 4-roll applicator may be as follows:

| Roll | Difference in speed from the relative web speed [%] |
|---|---|
| Metering roll | 0.1 to 25 in particular 1 to 2 |
| Doctor-blade roll | 10 to 100 in particular 30 to 40 |
| Transfer roll | 10 to 100 in particular 75 to 90 |

It has further been found that the coating process of the invention may be carried out in a particularly advantageous way by means of a 4-roll applicator unit whose rolls have the following properties:

| | |
|---|---|
| Metering roll, doctor-blade roll, and transfer roll | flexurally rigid, |
| Metering roll and transfer roll | steel, chrome-plated, pore-free, ground, high-gloss polished, max. peak-to-valley height 0.4 μm, |
| Doctor-blade roll | PU, Shore hardness D = 95. |

According to DIN 53505 (1987-06), in the testing of elastomers and rubber, the Shore hardness corresponds to the resistance to the penetration of a conical frustum (A or C) or a rounded-off cone (D), which is measured by the compression of a spring having defined spring characteristics and is expressed in dimensionless Shore A (C, D) hardness units. When testing steel, the Shore rebound hardness is measured in the so-called scleroscope, which determines the rebound height of a drop hammer which drops onto the test area in a vertical tube.

If the material is tacky in any form, it is particularly advantageous to make the transport means antiadhesive and/or to transport the material on the transport means using an antiadhesive underlay.

In one further preferred embodiment of the process, the antiadhesive underlay used is a process release liner which need not remain in the product and which in certain circumstances can be used repeatedly.

This liner is advantageously guided by way of a lay-on roll and is coated with the material, which, still on the process release liner is crosslinked with UV rays or electron beams and then is transferred using a laminating roll to a carrier or a release liner, which typically remains in the product. In accordance with the invention, the material then receives a second UV irradiation, which acts, however, on the other side, which is now open. It is economically advantageous to use the process release liner repeatedly and/or to cause it to run into a product at a later point in time.

With further preference, the transport means is composed of a roll having an antiadhesive coating.

In another preferred embodiment of the process, the antiadhesive underlay is an antiadhesive support cloth, especially a continuous cloth, or a fluid with which the transport means, especially roll, or the support cloth is wetted.

It is advantageous if the material is coated onto an antiadhesive support cloth, which is advantageously guided by way of a lay-on roll, is crosslinked by UV radiation before leaving the support cloth, and then is transferred using a laminating roll to a carrier or a release liner. In the embodiment according to the invention, the material then receives a second time a UV irradiation, which acts, however, on the other side, which is now open. This preferred embodiment of the process is also suitable for electron beam crosslinking. In this context it should be borne in mind that there are few if any known antiadhesive support cloths which are resistant to electron beams, so that the support cloth will have to be replaced more frequently or given a new antiadhesive coating more frequently.

In one particularly preferred variant of the process, the material is an adhesive, which is applied to a transport means in the form of a lay-on roll, which has been coated with a fluid or given an antiadhesive coating, thereby preventing the adhesive from sticking to the surface of the roll. While still on this lay-on roll, the material is crosslinked with UV rays or electron beams and then transferred with a laminating roll to a carrier or a release liner.

The process unit of the roll with an antiadhesive coating is disclosed in detail in DE 199 05 934 A1, and the process unit of wetting by means of a fluid is disclosed in detail in DE 199 05 935 A1. Both documents are to be referred to for details, and the contents of both documents is part of this invention and so becomes part of this disclosure.

Then, advantageously, the support cloth is guided by way of a chill roll.

The process of the invention is preferably applied to single-sided, double-sided and/or carrier-free (unbacked) adhesive tapes as web-form material.

As adhesives it is possible, for example, to use acrylics and rubbers from solution, from dispersion, or hotmelt adhesives, which may additionally have been filled, colored and/or foamed.

As carrier materials for the adhesive tapes mentioned it is possible, for example, to use those made of MOPP, BOPP, HDPE, LDPE, polyesters, PVC, paper, nonwovens or foams.

As substrate or carrier material it is also possible to use all known textile carriers such as wovens, knits, lays or nonwoven webs; the term "web" embraces at least textile sheetlike structures in accordance with EN 29092 (1988)

and also stitchbonded nonwovens and similar systems. It is likewise possible to use spacer fabrics, including wovens and knits, with lamination. Spacer fabrics of this kind are disclosed in EP 0 071 212 B1. Spacer fabrics are matlike layer structures comprising a cover layer of a fiber or filament fleece, an underlayer and individual retaining fibers or bundles of such fibers between these layers, said fibers being distributed over the area of the layer structure, being needled through the particle layer, and joining the cover layer and the underlayer to one another. As an additional though not mandatory feature, the retaining fibers in accordance with EP 0 071 212 B1 comprise inert mineral particles, such as sand, gravel or the like, for example. The holding fibers needled through the particle layer hold the cover layer and the underlayer at a distance from one another and are joined to the cover layer and the underlayer. Spacer wovens or spacer knits are described, inter alia, in two articles, namely an article from the journal kettenwirk-praxis 3/93, 1993, pages 59 to 63, "Raschelgewirkte Abstandsgewirke" [Raschel-knitted spacer knits] and an article from the journal kettenwirk-praxis 1/94, 1994, pages 73 to 76, "Raschelgewirkte Abstandsgewirke", the content of said articles being included here by reference and being part of this disclosure and invention.

Knitted fabrics are textile sheetlike structures produced from one or more threads or thread systems by intermeshing (interlooping), in contrast to woven fabrics, which are produced by intersecting two thread systems (warp and weft threads), and nonwovens (bonded fiber fabrics), where a loose fiber web is consolidated by heat, needling or stitching or by means of water jets.

Knitted fabrics can be divided into weft knits, in which the threads run in transverse direction through the textile, and warp knits, where the threads run lengthwise through the textile. As a result of their mesh structure, knitted fabrics are fundamentally pliant, conforming textiles, since the meshes are able to stretch lengthways and widthways, and have a tendency to return to their original position. In high-grade material, they are very robust.

Suitable nonwovens include, in particular, consolidated staple fiber webs, but also filament webs, meltblown webs, and spunbonded webs, which generally require additional consolidation. Known consolidation methods for webs are mechanical, thermal, and chemical consolidation. Whereas with mechanical consolidations the fibers are usually held together purely mechanically by entanglement of the individual fibers, by the interlooping of fiber bundles or by the stitching-in of additional threads, it is possible by thermal and by chemical techniques to obtain adhesive (with binder) or cohesive (binderless) fiber-fiber bonds. Given appropriate formulation and an appropriate process regime, these bonds may be restricted exclusively, or at least predominantly, to the fiber nodal points, so that a stable, three-dimensional network is formed while retaining the loose open structure in the web.

Webs which have proven particularly advantageous are those consolidated in particular by overstitching with separate threads or by interlooping.

Consolidated webs of this kind are produced, for example, on stitchbonding machines of the "Malifleece" type from the company Karl Meyer, formerly Malimo, and can be obtained, inter alia, from the companies Naue Fasertechnik and Techtex GmbH. A Malifleece is characterized in that a cross-laid web is consolidated by the formation of loops from fibers of the web. The carrier used may also be a web of the Kunit or Multiknit type. A Kunit web is characterized in that it originates from the processing of a longitudinally oriented fiber web to form a sheetlike structure which has the heads and legs of loops on one side and, on the other, loop feet or pile fiber folds, but possesses neither threads nor prefabricated sheetlike structures. A web of this kind has been produced, inter alia, for many years, for example on stitchbonding machines of the "Kunitvlies" type from the company Karl Mayer. A further characterizing feature of this web is that, as a longitudinal-fiber web, it is able to absorb high tensile forces in the longitudinal direction. The characteristic feature of a Multiknit web relative to the Kunit is that the web is consolidated on both the top and bottom sides by virtue of the double-sided needle punching. Finally, stitch bonded webs are also suitable as an intermediate for forming an adhesive tape. A stitchbonded web is formed from a nonwoven material having a large number of stitches extending parallel to one another. These stitches are brought about by the incorporation, by stitching or knitting, of continuous textile threads. For this type of web, stitchbonding machines of the "Maliwatt" type from the company Karl Mayer, formerly Malimo, are known.

Also particularly advantageous is a staple fiber web which is mechanically preconsolidated in the first step or is a wet laid web laid hydrodynamically, in which between 2% and 50% of the web fibers are fusible fibers, in particular between 5% and 40% of the fibers of the web. A web of this kind is characterized in that the fibers are laid wet or, for example, a staple fiber web is preconsolidated by the formation of loops from fibers of the web or by needling, stitching or air-jet and/or water-jet treatment. In a second step, thermofixing takes place, with the strength of the web being increased again by the (partial) melting of the fusible fibers. The web carrier may also be consolidated without binders, by means for example of hot embossing with structured rolls, with properties such as strength, thickness, density, flexibility, and the like being controllable via the pressure, temperature, residence time, and embossing geometry.

For the use of nonwovens, the adhesive consolidation of mechanically preconsolidated or wet-laid webs is of particular interest, it being possible for said consolidation to take place by way of the addition of binder in solid, liquid, foamed or pastelike form. A great diversity of theoretical embodiments is possible: for example, solid binders as powders for trickling in; as a sheet or as a mesh, or in the form of binding fibers. Liquid binders may be applied as solutions in water or organic solvent or as a dispersion. For adhesive consolidation, binder dispersions are predominantly chosen: thermosets in the form of phenolic or melamine resin dispersions, elastomers as dispersions of natural or synthetic rubbers, or, usually, dispersions of thermoplastics such as acrylates, vinyl acetates, polyurethanes, styrene-butadiene systems, PVC, and the like, and also copolymers thereof. Normally, the dispersions are anionically or nonionically stabilized, although in certain cases cationic dispersions may also be of advantage.

The binder may be applied in a manner which is in accordance with the prior art and for which it is possible to consult, for example, standard works of coating or of nonwoven technology such as "Vliesstoffe" (Georg Thieme Verlag, Stuttgart, 1982) or "Textiltechnik-Vliesstofferzeugung" (Arbeitgeberkreis Gesamttextil, Eschborn, 1996).

For mechanically preconsolidated webs which already possess sufficient composite strength, the single-sided spray application of a binder is appropriate for effecting specific changes in the surface properties. Such a procedure is not only sparing in its use of binder but also greatly reduces the energy requirement for drying. Since no squeeze rolls are required and the dispersion remains predominantly in the upper region of the web material, unwanted hardening and stiffening of the web can very largely be avoided. For sufficient adhesive consolidation of the web carrier, the addition of binder in the order of magnitude of from 1% to 50%, in particular from 3% to 20%, based on the weight of the fiber web, is generally required.

The binder may be added as early as during the manufacture of the web, in the course of mechanical preconsolidation, or else in a separate process step, which may be carried out in-line or off-line. Following the addition of the binder it is necessary temporarily to generate a condition in which the binder becomes adhesive and adhesively connects the fibers—this may be achieved during the drying, for example, of dispersions, or else by heating, with further possibilities for variation existing by way of areal or partial application of pressure. The binder may be activated in known drying tunnels, or else, given an appropriate selection of binder, by means of infrared radiation, UV radiation, ultrasound, high-frequency radiation or the like. For the subsequent end use it is sensible, although not absolutely necessary, for the binder to have lost its tack following the end of the web production process. It is advantageous that, as a result of the thermal treatment, volatile components such as fiber assistants are removed, giving a web having favorable fogging values so that when a low-fogging adhesive is used it is possible to produce an adhesive tape having particularly advantageous fogging values.

A further, special form of adhesive consolidation consists in activating the binder by incipient dissolution or swelling. In this case it is also possible in principle for the fibers themselves, or admixed special fibers, to take over the function of the binder. Since, however, such solvents are objectionable on environmental grounds, and/or are problematic in their handling, for the majority of polymeric fibers, this process is not often employed.

Starting materials envisaged for the textile carrier include, in particular, polyester, polypropylene, viscose or cotton fibers. The selection is, however, not restricted to said materials; rather it is possible to use a large number of other fibers to produce the web, this being evident to the skilled worker without any need for inventive activity.

Carrier materials used further include, in particular, laminates and nets, and also films (for example, a polyolefin from the group of the polyethylenes (for example, HDPE, LDPE, MDPE, LLDPE, VLLDPE, copolymers of ethylene with polar comonomers) and/or the group of the polypropylenes (for example, polypropylene homopolymers, random polypropylene copolymers or block polypropylene copolymers), monoaxially or biaxially oriented polypropylene, polyesters, PVC, PET, polystyrene, polyamide or polyimide), foams, foam material, of polyethylene and polyurethane, for example, foamed films, and creped and uncreped paper. Moreover, these materials may have been given a pretreatment and/or an aftertreatment. Common pretreatments are corona irradiation, impregnation, coating, painting, and hydrophobicization; customary aftertreatments are calendering, thermal conditioning, lamination, die cutting, and enveloping.

Low flammability in the carrier material and in the adhesive tape as a whole may be achieved by adding flame retardants to the carrier and/or to the adhesive. These retardants may be organobromine compounds, together where appropriate with synergists such as antimony trioxide; however, with a view to the absence of halogens from the adhesive tape, preference will be given to using red phosphorus, organophosphorus compounds, mineral compounds or intumescent compounds such as ammonium polyphosphate, alone or in conjunction with synergists.

As adhesives it is possible to use substantially all known adhesives. The adhesive of the adhesive tape may be composed of an adhesive based on solventborne natural rubber adhesives and acrylic adhesives. Preference is given to adhesives based on acrylic dispersions; adhesives based on styrene-isoprene-styrene block copolymers are particularly preferred. These adhesive technologies are known and are used in the adhesive tape industry.

The adhesive tapes can be produced by known methods. An overview of customary production methods can be found, for example, in "Coating Equipment", Donatas Satas in Handbook of Pressure Sensitive Adhesive Technology, second edition, edited by Donatas Satas, Van Nostrand Reinhold New York pp. 767–808. The known methods of drying and slitting the adhesive tapes are likewise to be found in the Handbook of Pressure Sensitive Adhesive Technology, pp. 809–874.

A suitable adhesive composition is one based on acrylic hotmelt, having a K value of at least 20, in particular more than 30 (measured in each case in 1% strength by weight solution in toluene at 25° C.), obtainable by concentrating a solution of such a composition to give a system which can be processed as a hotmelt. Concentrating may take place in appropriately equipped vessels or extruders; particularly in the case of accompanying devolatilization, a devolatilizing extruder is preferred. An adhesive of this kind is set out in DE 43 13 008 C2. In an intermediate step, the solvent is removed completely from the acrylate compositions prepared in this way.

The K value is determined in particular in analogy to DIN 53 726.

In addition, further volatile constituents are removed. After coating from the melt, these compositions contain only small fractions of volatile constituents. Accordingly, it is possible to adopt all of the monomers/formulations claimed in the above-cited patent. A further advantage of the compositions described in the patent is that they have a high K value and thus a high molecular weight. The skilled worker is aware that systems with higher molecular weights may be crosslinked more efficiently. Accordingly, there is a corresponding reduction in the fraction of volatile constituents.

The solution of the composition may contain from 5 to 80% by weight, in particular from 30 to 70% by weight, of solvent.

It is preferred to use commercially customary solvents, especially low-boiling hydrocarbons, ketones, alcohols and/or esters.

Preference is further given to using single-screw, twin-screw or multiscrew extruders having one or, in particular, two or more devolatilizing units.

The adhesive based on acrylic hotmelt may contain copolymerized benzoin derivatives, such as benzoin acrylate or benzoin methacrylate, for example, acrylates or methacrylates. Benzoin derivatives of this kind are described in EP 0 578 151 A.

The adhesive based on acrylic hotmelt may be UV-crosslinked. Other types of crosslinking, however, are also possible, an example being electron beam crosslinking.

In one particularly preferred embodiment, self-adhesive compositions used comprise copolymers of (meth)acrylic acid and esters thereof having from 1 to 25 carbon atoms, maleic, fumaric and/or itaconic acid and/or esters thereof, substituted (meth)acrylamides, maleic anhydride, and other vinyl compounds, such as vinyl esters, especially vinyl acetate, vinyl alcohols and/or vinyl ethers.

The residual solvent content should be below 1% by weight.

It is also possible to use an adhesive from the group of the natural rubbers or the synthetic rubbers or any desired blend of natural and/or synthetic rubbers, the natural rubber or rubbers being selectable in principle from all available grades such as, for example, crepe, RSS, ADS, TSR or CV grades, depending on required purity and viscosity, and the synthetic rubber or rubbers being selectable from the group of randomly copolymerized styrene-butadiene rubbers (SBR), butadiene rubbers (BR), synthetic polyisoprenes (IR), butyl rubbers (IIR), halogenated butyl rubbers (XIIR), acrylic rubbers (ACM), ethylene-vinyl acetate (EVA) copolymers and polyurethanes and/or blends thereof.

Furthermore, and preferably, the processing properties of the rubbers may be improved by adding to them thermoplastic elastomers with a weight fraction of from 10 to 50% by weight, based on the total elastomer fraction. As representatives, mention may be made at this point, in particular, of the particularly compatible styrene-isoprene-styrene (SIS) and styrene-butadiene-styrene (SBS) types.

As tackifying resins it is possible without exception to use all known tackifier resins which have been described in the literature. Representatives that may be mentioned include the rosins, their disproportionated, hydrogenated, polymerized, esterified derivatives and salts, the aliphatic and aromatic hydrocarbon resins, terpene resins, and terpene-phenolic resins. Any desired combinations of these and other resins may be used in order to adjust the properties of the resulting adhesive in accordance with what is desired. Explicit reference is made to the depiction of the state of the art in the "Handbook of Pressure Sensitive Adhesive Technology" by Donatas Satas (van Nostrand, 1989).

"Hydrocarbon resin" is a collective term for thermoplastic polymers which are colorless to intense brown in color and have a molar mass of generally <2000.

They may be divided into three main groups according to their provenance: petroleum resins, coal tar resins, and terpene resins. The most important coal tar resins are the coumarone-indene resins. The hydrocarbon resins are obtained by polymerizing the unsaturated compounds that can be isolated from the raw materials.

Included among the hydrocarbon resins are also polymers obtainable by polymerizing monomers such as styrene and/ or by means of polycondensation (certain formaldehyde resins), with a correspondingly low molar mass. Hydrocarbon resins are products with a softening range that varies within wide limits from <0° C. (hydrocarbon resins liquid at 20° C.) to >200° C. and with a density of from about 0.9 to 1.2 g/cm$^3$ They are soluble in organic solvents such as ethers, esters, ketones, and chlorinated hydrocarbons, and are insoluble in alcohols and water.

By rosin is meant a natural resin which is recovered from the crude resin from conifers. Three types of rosin are differentiated: balsam resin, as a distillation residue of turpentine oil; root resin, as the extract from conifer root stocks; and tall resin, the distillation residue of tall oil. The most significant in terms of quantity is balsam resin.

Rosin is a brittle, transparent product with a color ranging from red to brown. It is insoluble in water but soluble in many organic solvents such as (chlorinated) aliphatic and aromatic hydrocarbons, esters, ethers, and ketones, and also in plant oils and mineral oils. The softening point of rosin is situated within the range from approximately 70 to 80° C.

Rosin is a mixture of about 90% resin acids and 10% neutral substances (fatty acid esters, terpene alcohols, and hydrocarbons). The principal rosin acids are unsaturated carboxylic acids of empirical formula $C_{20}H_{30}O_2$, abietic, neoabietic, levopimaric, pimaric, isopimaric, and palustric acid, as well as hydrogenated and dehydrogenated abietic acid. The proportions of these acids vary depending on the provenane of the rosin.

Plasticizers which can be used are all plasticizing substances known from adhesive tape technology. They include, inter alia, the paraffinic and naphthenic oils, (functionalized) oligomers such as oligobutadienes and oligoisoprenes, liquid nitrile rubbers, liquid terpene resins, animal and vegetable oils and fats, phthalates, and functionalized acrylates.

For the purpose of heat-induced chemical crosslinking, it is possible to use all known heat-activatable chemical crosslinkers such as accelerated sulfur or sulfur donor systems, isocyanate systems, reactive melamine resins, formaldehyde resins, and (optionally halogenated) phenol-formaldehyde resins and/or reactive phenolic resin or diisocyanate crosslinking systems with the corresponding activators, epoxidized polyester resins and acrylic resins, and combinations thereof. The crosslinkers are preferably activated at temperatures above 50° C., in particular at temperatures from 100° C. to 160° C., with very particular preference at temperatures from 110° C. to 140° C. The thermal excitation of the crosslinkers may also be effected by means of IR rays or other high-energy electromagnetic alternating fields.

By means of the process of the invention, especially in the advanced variants of the process, it is possible to achieve approximately a doubling of the film thickness which can be sufficiently homogeneously irradiated. Particularly in the case of UV radiation, even at relatively low film thicknesses, it is possible to counter the exponential decrease in total UV dose with depth, as a result of which, for example, optimization between adhesion and cohesion is more successful.

Particularly if the process is used for crosslinking adhesive tapes, a marked increase in the crosslinkable film thicknesses or a substantially more constant crosslinking with depth is achieved in the case of UV crosslinking. In the case of electron beam crosslinking, a doubling of the crosslinkable film thickness for a given maximum acceleration voltage, or the setting of desired depth-dose profiles, can be achieved.

In addition, it is advantageous if in order to produce double-sided adhesive tapes with the above embodiments a release liner is laminated onto the adhesive crosslinked from both sides, with a carrier as substrate, and if the procedure used to coat and crosslink the second adhesive film is the same as for the first adhesive film except that the assembly run through the unit, instead of the carrier, is the assembly formed from carrier, first adhesive film, and release liner.

Particularly in the case of carriers with a textured surface, such as wovens, nonwovens, and papers, for example, and also with smooth carriers as well in certain circumstances, it is advantageous to cause the absorbed radiation dose to rise from the open side toward the carrier. The effect of this is a higher inner strength of the adhesive or else a higher solvent resistance of the product, with substantial retention of the surface properties of the adhesive side(s).

It is also advantageous if the radiation dose is at a maximum in the center of the adhesive. Cohesive fractures generally occur in this region or if the absorbed radiation dose rises from the open side toward the carrier.

If the substrate too is to receive a specific radiation dose for the purpose of improving the properties, then it is advantageous for the substrate to receive a different radiation dose than the material. By skillful setting of the paramaters for the first and second irradiation procedures, the radiation dose in the substrate can be set with relative freedom up to the level of the dose in the material using the process of the invention, and especially when carrying out irradiation with electrons.

An advantageous finding is that the homogeneity of the dose with depth in the material is more constant than in the case of single-sided UV irradiation, which is characterized by an approximately exponential decrease in dose with depth.

A further advantageous finding is that the maximum thickness of material with sufficient homogeneous crosslinking and/or polymerization over the depth is much higher than in the case of single-sided irradiation of the material.

Preferably, the substrate receives a different radiation dose than the material.

The resultant radiation doses in the adhesives can be preferably up to 100 kGy or more, and EB acceleration voltages of from 40 to 500 kV can be chosen.

Instead of crosslinking, in the case of the embodiments described it is also possible for polymerization to take place.

Finally, the process of the invention can be used with advantage for the radiation-chemical crosslinking of carrier materials coated double-sidedly, in which case a carrier material coated on both sides may receive different overall doses for the two sides.

The figures described below illustrate particularly advantageous embodiments of the invention, without wishing to impose any unnecessary restriction through the choice of figures shown.

Figure 1:
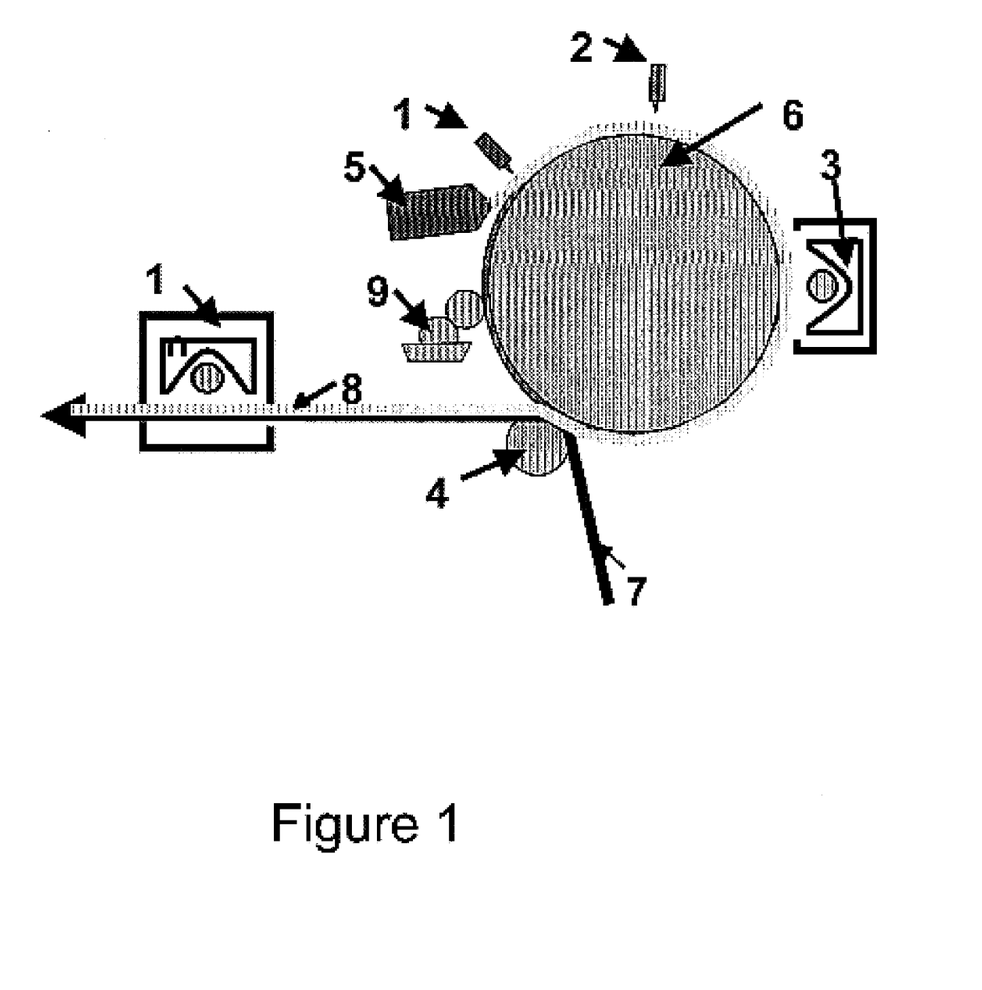
FIG. 1 shows the process of the invention in one particularly advantageous embodiment.

Thus FIG. 1 shows a device in which an adhesive 8 is placed onto a lay-on roll 6 by a slot die 5. In other words, it shows a process for producing adhesive tapes. Prior to the placement of the adhesive 8, the lay-on roll 6 is wetted with a fluid by the application system 9. The effect of the applied fluid is that the adhesive 8 does not stick to the lay-on roll 6.

Following the placement by coating die 5, the adhesive 8 is conveyed beneath the lay-on electrode 1. By means of a high voltage, the lay-on electrode 1 applies negative ions to the adhesive 8. Countercharges immediately develop on the surface of the lay-on roll 6. The resulting field exerts a force on the adhesive that presses it onto the lay-on roll 6.

After traversing the countercharging electrode 2, the adhesive is guided, still on the lay-on roll 6, through the UV unit 3 and is subject to irradiation. After that, the adhesive 8 is transferred to the substrate 7 by means of the contact roll 4. This is followed by a second UV irradiation with the UV unit 10 on the opposite side of the adhesive from the first irradiation.

The substrate 7 is a release liner, composed of a monoaxially oriented polypropylene film provided on both sides with antiadhesive silicone layers. The countercharging electrode 2 applies positive charges to the adhesive 8, so that the charges cancel each other out.

Figure 2:
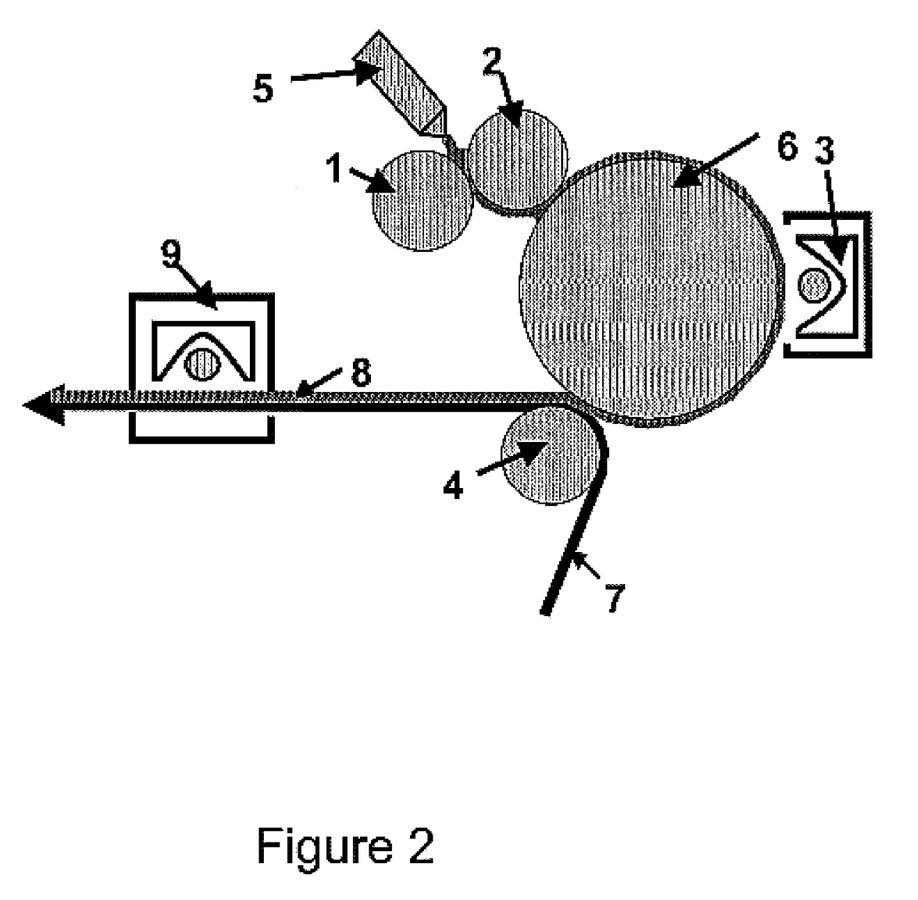
FIG. 2 shows the process of the invention in a second particularly advantageous embodiment.

FIG. 2 shows a device in which a slot die 5 feeds a multiroll applicator system, consisting of rolls 1, 2, 6 and 4, with the adhesive 8. In other words, it shows a process for producing adhesive tapes.

By means of the coating rolls 1, 2 and 6, the adhesive 8 is shaped to the form of a web.

On the coating roll 6, the composition is passed through the UV unit 3 and irradiated. After that the adhesive 8 is transferred to the substrate 7 with the aid of the coating roll 4. This is followed by a second UV irradiation with the UV unit 9 on the opposite side of the adhesive from the first irradiation.

The coating roll 4 typically has a higher peripheral speed than the coating roll 6.

The substrate 7 is a BOPP film having a thickness of 50 μm.

In the text below, the intention is to illustrate processes of the invention with reference to a number of examples, here again without wishing to subject the invention to any unnecessary restriction.

EXAMPLES

Example 1

In order to produce an adhesive tape for cable bandaging, an open "Malifleece" from Karl Meyer was coated on a lay-on roll with an acrylic hotmelt composition from BASF (type: Acronal DS 3458). Application of the adhesive at a rate of 90 g/m² was carried out using a slot die (from Verbrüggen, Belgium) with a coating width of 70 cm, at a distance of about 10 mm from the lay-on roll, the slot die being thermostated at 90° C. The lay-on roll had a diameter of 500 mm and a temperature of 40° C.

The composition was pressed on using a high-voltage electrode (type: R130A from Eltex), which was arranged over the line of application of the adhesive to the nonwoven. With a high voltage of +14.3 kV, the adhesive seeped to the desired extent into the open substrate.

Using a medium-pressure UV lamp with an electrical output of 160 W/cm from IST, which was mounted over the lay-on roll, on the opposite side to the die, UV crosslinking was carried out at a belt speed of 10 m/min.

Following UV crosslinking, the adhesive tape was removed from the lay-on roll via an antiadhesive contact roll and was then wound up. Upstream of the UV lamp in the running direction of the nonwoven there was a second high-voltage electrode of the same type, with which the charges from the first electrode were neutralized by means of countercharges of reverse polarity.

Because of the high level of heating on UV irradiation, the nonwoven shrank by about 8%. On the carrier side, moreover, there was virtually no crosslinking of the adhesive, as a result of which the desired shear strengths and sufficient resistance to solvents (especially to diesel and gasoline for cable tape applications in automotive construction) were not achieved. In some cases, there was hardly any penetration of crosslinked constituents of the adhesive through the nonwoven. On the other hand, the adhesive on the open side, i.e., the side facing the UV lamp, was already overcrosslinked to such an extent that an increase in the dose, for the purpose of increasing the crosslinking of the lower-line layers, was no longer acceptable.

In the subsequent course of the experiment, in the same experimental system, the adhesive was coated onto a release paper instead of being coated directly onto the Malifleece, and as before was crosslinked on the lay-on roll with the same UV lamp output as before but at a web speed of 30 m/min.

Using the contact roll described above, the Malifleece was then laminated onto the adhesive side. After that the assembly was wound up. In a second operation, the release paper was removed in the course of unwinding and the adhesive, now on the Malifleece, was passed through on the lay-on roll beneath the UV lamp a second time, now at 20 m/min but again with the same UV lamp output as before.

Because of the substantially lower temperature load, shrinkage of the nonwoven was now less than about 2%. Because of the greatly reduced overcrosslinking of the adhesive in the surface region, the tack of the adhesive was also much higher. Moreover, the adhesive was now sufficiently crosslinked on the carrier side as well, giving the desired shear strengths and sufficient resistance to solvents (especially to diesel and gasoline for cable tape applications in automotive construction). Constituents of the adhesive were no longer pressed through the nonwoven.

Example 2

A double-sided adhesive tape was manufactured in the worksteps of
a) applying a first layer of adhesive at 100 g/m² with a slot die to a lay-on roll, covered with a fluid film between adhesive and roll, at a roll speed of 20 m/min,
b) UV-irradiating the adhesive with a UV lamp above the lay-on roll, with an output of 160 W/cm,
c) transferring the layer of adhesive to a 50 µm thick BOPP carrier, using a press-on roll,
d) UV-irradiating the adhesive on the carrier with a UV lamp above the adhesive side, with an ouput of 160 W/cm,
e) applying a release liner, to give an assembly composed of release liner, adhesive, and carrier,
f) applying a second layer of adhesive at 100 g/m² with a slot die to a lay-on roll, covered with a fluid film between adhesive and roll, at a roll speed of 20 m/min,
g) UV-irradiating the adhesive with a UV lamp above the lay-on roll, with an output of 160 W/cm,
h) transferring the layer of adhesive to the carrier side of the assembly, using the press-on roll,
i) UV-irradiating the adhesive on the assembly with a UV lamp above the open side, with an ouput of 160 W/cm.

The aim of this experiment was to produce a double-sided adhesive tape with a BOPP carrier 50 µm thick and layers of adhesive, each 100 µm thick, on both sides, the adhesive used being a UV-crosslinking acrylic hotmelt from BASF (Acronal DS 3458) which for crosslinking has its principal excitation at UVC wavelengths from 250 to 260 nm. Since the acrylic adhesive strongly absorbs the UVC rays in this wavelength range, the UVC intensity at depths of 100 µm has already fallen to such an extent, as described early on above, that at this depth only very slight, inadequate crosslinking takes place.

In terms of technical measurement, this was detected by the following methods. A 100 µm layer of adhesive on a release liner was irradiated with UV, cooled to a temperature of about −30° C., and then cut into layers 10 µm thick using a cryomicrotome from Jung. These layers were placed in bottles on a shaker table in toluene for one day, with a weight fraction of 1% relative to the toluene. The contents of the bottles were then passed through a filter. The fraction of the adhesive remaining in the filter is insoluble and has therefore been crosslinked. The percentage insoluble fraction is a measure of the degree of crosslinking.

Figure 3:
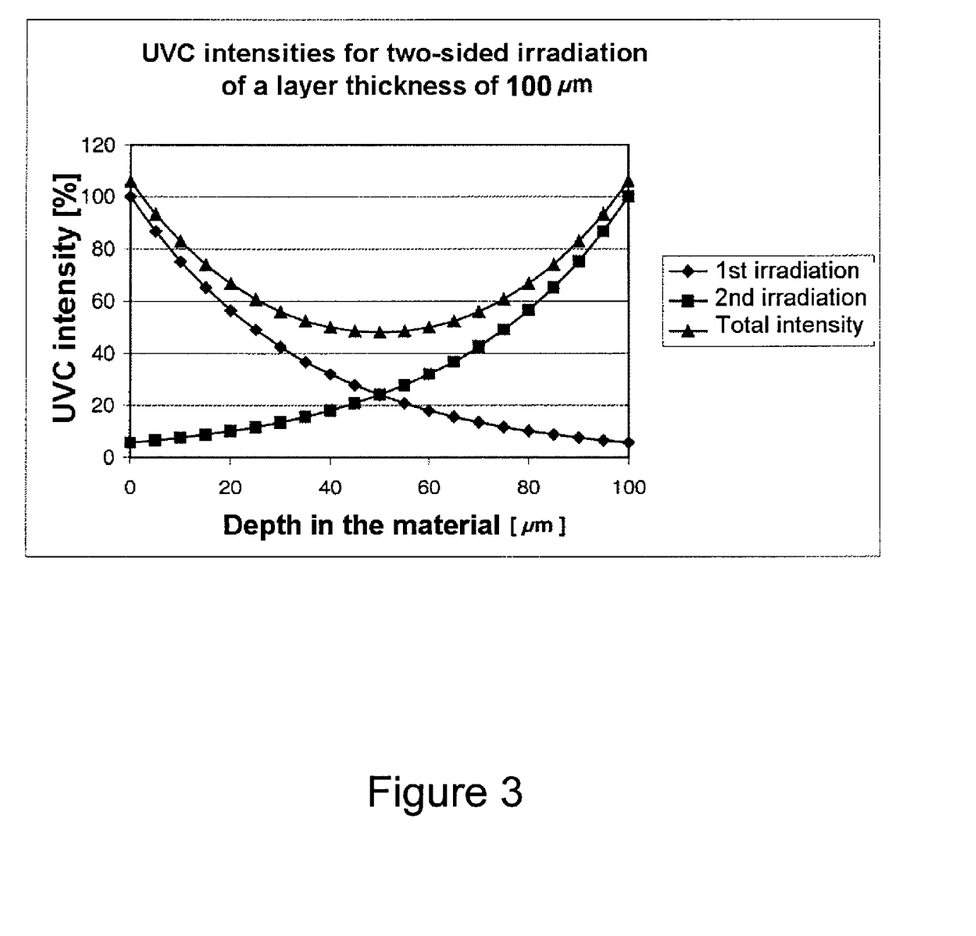
FIG. 3 shows the UVC intensity in the adhesive films.

FIG. 3 shows the UVC intensity in the adhesive films, calculated from the measured crosslinking profiles, for one-sided and double-sided irradiation.

UVC Intensities

The stability times of the adhesive films under shearing were determined by means of the following method.

Shear stability time (holding power, HP): The holding power indicates the bond strength for a load force acting parallel to the bonded tape. It is the time measured until an adhesive tape shears off completely under load from a steel plate. To determine the holding powers, a test strip 19 mm wide was bonded to a pretreated (see 180° detachment adhesion) steel plate so as to give a bond area of 19×20 mm². Using a bracket, a 1 kg weight is suspended from the projecting end of the adhesive tape, so that a vertical tensile force of 5.15 N per cm tape width is transmitted.

The measurements were conducted at room temperature (Rt=22° C.) and in some cases also at 80° C. The unit of the holding power is minutes. Where the symbol ">" stands before the figures, this means that the measurements were terminated after this time, since no shearing had yet been observed. "(C)" denotes cohesive fracture with residues of adhesive. "(A)" is the abbreviation for adhesive fracture.

In the case of UV irradiation following manufacture in accordance with the invention, in the case of which, as described in this example, the adhesive layers were each irradiated from both sides, holding powers of approximately 1000 minutes were found for a layer thickness of 100 µm.

In the case of alternative UV irradiation from one side only, no holding powers >200 minutes were found even when the UV radiation dose was varied.

Example 3

A single-sided adhesive tape was manufactured in the worksteps of
a) applying a first adhesive layer of 100 g/m² with a slot die to a lay-on roll, covered with a fluid film between adhesive and roll, with a roll speed of 20 m/min,
b) UV-irradiating the adhesive with a UV lamp above the lay-on roll, with an output of 160 W/cm,
c) transferring the adhesive layer to a 50 µm thick BOPP carrier with a press-on roll,
d) UV-irradiating the adhesive on the carrier with a UV lamp above the adhesive side, with an output of 160 W/cm,
e) applying a release liner, to give an assembly composed of release liner, adhesive, and carrier.

For comparative purposes, one-sided UV irradiation at different layer thicknesses was carried out, the UVC dosage for each layer thickness being optimized so as to maximize the shear strength of the adhesive layer.

The shear strengths were measured from holding powers by the method described in Example 2.

The adhesive used was an in-house development, an acrylic hotmelt with copolymerized benzoin acrylate as crosslinker, which is sensitive at UV wavelengths in the range from 250 to 260 nm.

The table below shows the holding powers found at optimized UV doses for different layer thicknesses.

| Layer thickness [μm] | 20 | 40 | 60 | 80 | 100 | 100 |
|---|---|---|---|---|---|---|
| Type of UV irradiation | one side | One side | one side | one side | one side | both sides |
| Holding power [minutes] | >5000 | >5000 | 1500 | 500 | 200 | 3000 |

In the case of UV irradiation in accordance with the prior art, the holding power at layer thicknesses >60 μm fall off sharply and at 100 μm holding powers of only about 200 minutes are typically found. In the case of UV irradiation in accordance with manufacture as per the invention, for which, as described in this example, the adhesive films were each irradiated on both sides, holding powers of around 3000 minutes were found for layer thicknesses of 100 μm.

What is claimed is:

1. A process for irradiating material in web form by means of electron beams and/or UV rays, wherein the material is applied to a transport means, the material on the transport means is guided through a first irradiation in which the material is irradiated on an open side, the material is transferred from the transport means to a substrate, and the material on the substrate is guided through a second irradiation in which the material is irradiated on a second, hitherto unirradiated, open side.

2. The process as claimed in claim 1, wherein the material is shaped to a web with a die.

3. The process as claimed in claim 2, wherein the die is a slot die, two-manifold or multimanifold die or adapter die.

4. The process as claimed in claim 1, wherein the material is shaped to a web in a two-roll or multiroll applicator system, the first irradiation of the material takes place on one of the rolls of the two-roll or multiroll applicator system, the material is transferred to the substrate by means of a further, transfer roll over which the substrate runs.

5. The process as claimed in claim 1, wherein the transport means has an antiadhesive finish and/or the material is transported by way of the transport means using an antiadhesive underlay.

6. The process as claimed in claim 1, wherein the transport means is a roll having an antiadhesive coating.

7. The process as claimed in claim 1, wherein the antiadhesive underlay is an antiadhesive support cloth or a fluid, with which the transport means or the support cloth is wetted.

8. The process as claimed in claim 7, wherein the antiadhesive support cloth is a continuous cloth and/or the transport means is a roll.

9. The process as claimed in claim 1, wherein the substrate is composed of one or more layers and/or the material is composed of one or more layers, at least one of the layers being adhesive.

10. The process as claimed in claim 1, wherein the substrate is a release liner and the material composed of a first adhesive, carrier, and a second adhesive is discharged from a three-manifold die or adapter die.

11. The process as claimed in claim 1, wherein the material in web form is a single-sided, double-sided and/or carrier-free (unbacked) adhesive tape.

12. The process as claimed in claim 1, wherein carrier materials used comprise MOPP, BOPP, HDPE, LDPE, polyesters, PVC, paper, nonwovens or foams.

13. The process as claimed in claim 1, wherein adhesives used comprise acrylics and rubbers from solution, from dispersion, or hotmelt adhesives.

14. The process as claimed in claim 13, wherein the adhesives have been filled, colored and/or foamed.

15. The process as claimed in claim 1, wherein irradiation with UV rays and/or electron beams brings about crosslinking and/or polymerization of the material.

16. The process as claimed in claim 1, wherein the resulting radiation dosage in the adhesives are up to 100 kGy or more and/or EB acceleration voltages of from 40 to 500 kV are chosen.

17. The process as claimed in claim 1, wherein the two coatings receive different radiation doses.

* * * * *

UNITED STATES PATENT AND TRADEMARK OFFICE
CERTIFICATE OF CORRECTION

PATENT NO. : 6,677,000 B2
DATED : January 13, 2004
INVENTOR(S) : Neuhaus-Steinmetz et al.

It is certified that error appears in the above-identified patent and that said Letters Patent is hereby corrected as shown below:

Column 4,
Line 33, "th an" should read -- than --

Signed and Sealed this

Twenty-sixth Day of July, 2005

JON W. DUDAS
*Director of the United States Patent and Trademark Office*